US006874142B1

(12) United States Patent  (10) Patent No.: US 6,874,142 B1
Ogura  (45) Date of Patent: Mar. 29, 2005

(54) SYSTEM AND METHOD FOR AUTOMATICALLY SETTING APPLET LATEST VERSION

(75) Inventor: Koujirou Ogura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 524 days.

(21) Appl. No.: 09/714,156

(22) Filed: Nov. 17, 2000

(30) Foreign Application Priority Data

Feb. 29, 2000 (JP) .................................. 2000-054056

(51) Int. Cl.[7] .............................................. G06F 9/44
(52) U.S. Cl. ...................... 717/170; 717/168; 717/174; 709/203
(58) Field of Search ................................ 717/170, 168, 717/169, 171–178; 707/203, 201; 709/201, 203

(56) References Cited

U.S. PATENT DOCUMENTS

| 5,649,195 A | * | 7/1997 | Scott et al. .................. 707/201 |
| 6,167,567 A | * | 12/2000 | Chiles et al. ................ 717/173 |
| 6,272,677 B1 | * | 8/2001 | Lam et al. ................... 717/170 |
| 6,360,366 B1 | * | 3/2002 | Heath et al. ................. 717/178 |

FOREIGN PATENT DOCUMENTS

JP  A-10-315171  12/1998
JP  A-10-320209  12/1998

OTHER PUBLICATIONS

Hericko, Juric, Zivkovic, Rozman, Domajnko and Krisper, "JAVA and Distributed Object Models: An Analysis", p. 57–65, Dec. 1998, retrieved from ACM Portal Database, Oct. 7, 2003.*

Korn, Jeffrey, Chen, Yih–Farn, Koutsofios, Eleftherios, "Chava: Reverse Engineering and Tracking of JAVA Applets", Oct. 1999, retrieved from IEEE dtabase Oct. 7, 2003.*

Slein, J., Vitali, F., Whitehead, E., Durand, D., "Requirements for a Distributed Authoring and Versioning Portocol for the World Wide Web", Feb. 1998, pp. 1–20, retrieved from google.com search, http://www.ietf.org/rfc/rfc2291.txt, on Oct. 6, 2003.*

"Microsoft Computer Dictionary Fifth Edition", Published by Microsoft Press, copyright 2002, p. 31 for reference to "Applet".*

* cited by examiner

Primary Examiner—Wei Y Zhen
Assistant Examiner—Mary Steelman
(74) Attorney, Agent, or Firm—Staas & Halsey LLP

(57) ABSTRACT

An applet latest version automatically setting system automatically sets the latest version of an applet such as a Java applet, etc. at a request of a client. Specifically, it stores in a method of an applet a program to update a version, realizes the update of the version of an applet in a process of the applet itself, and can necessarily use an applet of the latest version.

16 Claims, 11 Drawing Sheets

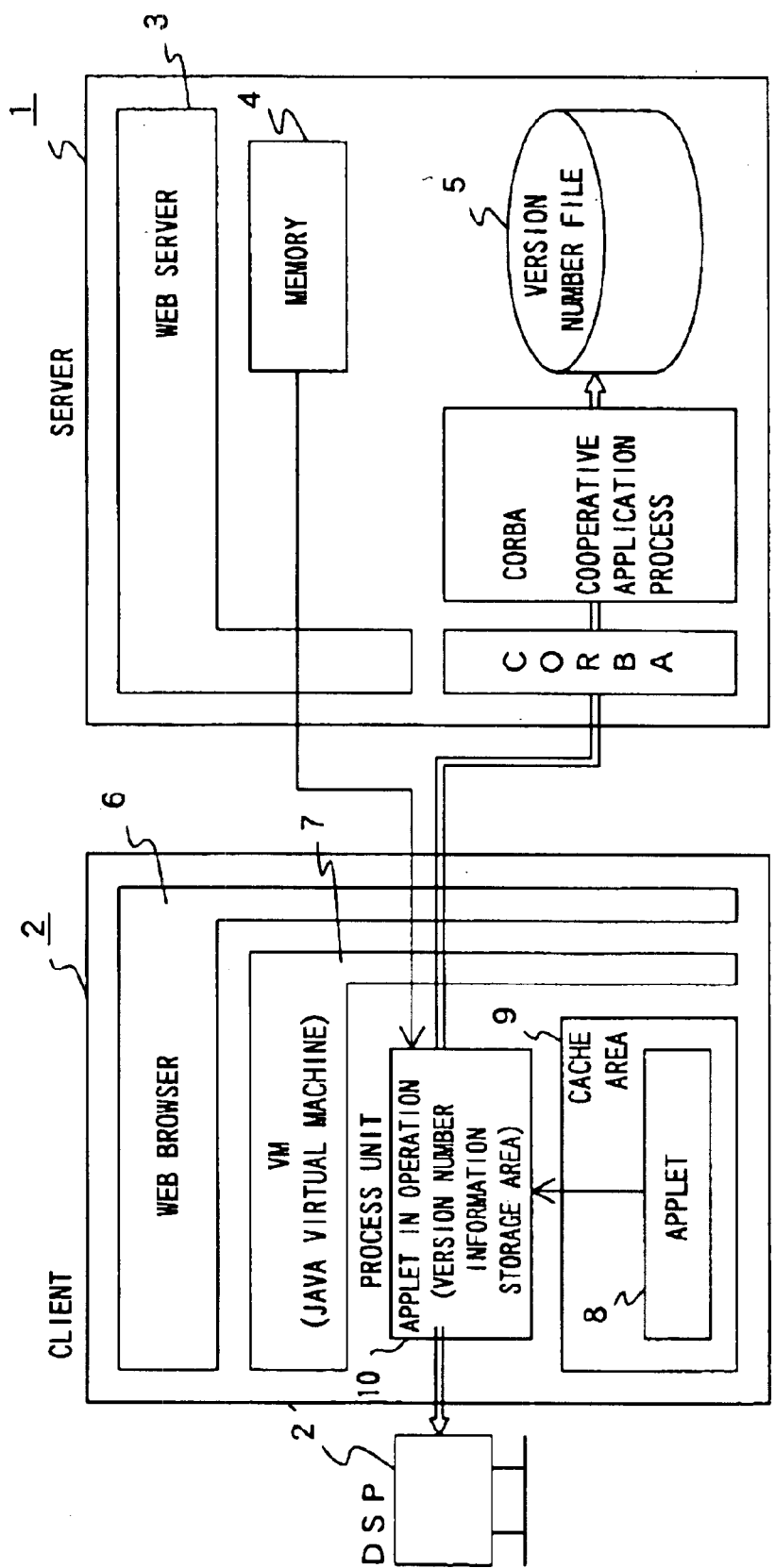
F I G. 1

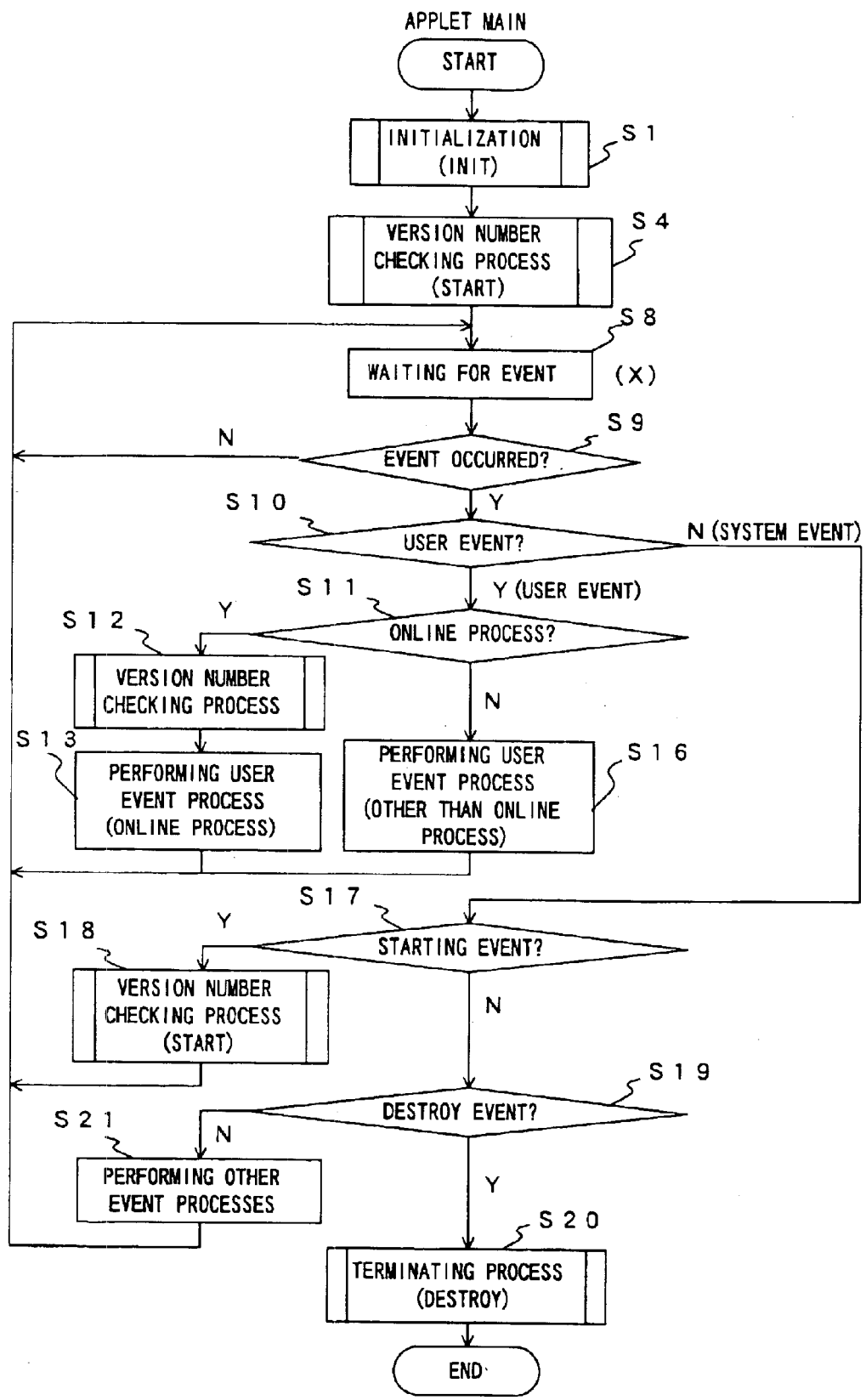
F I G. 4

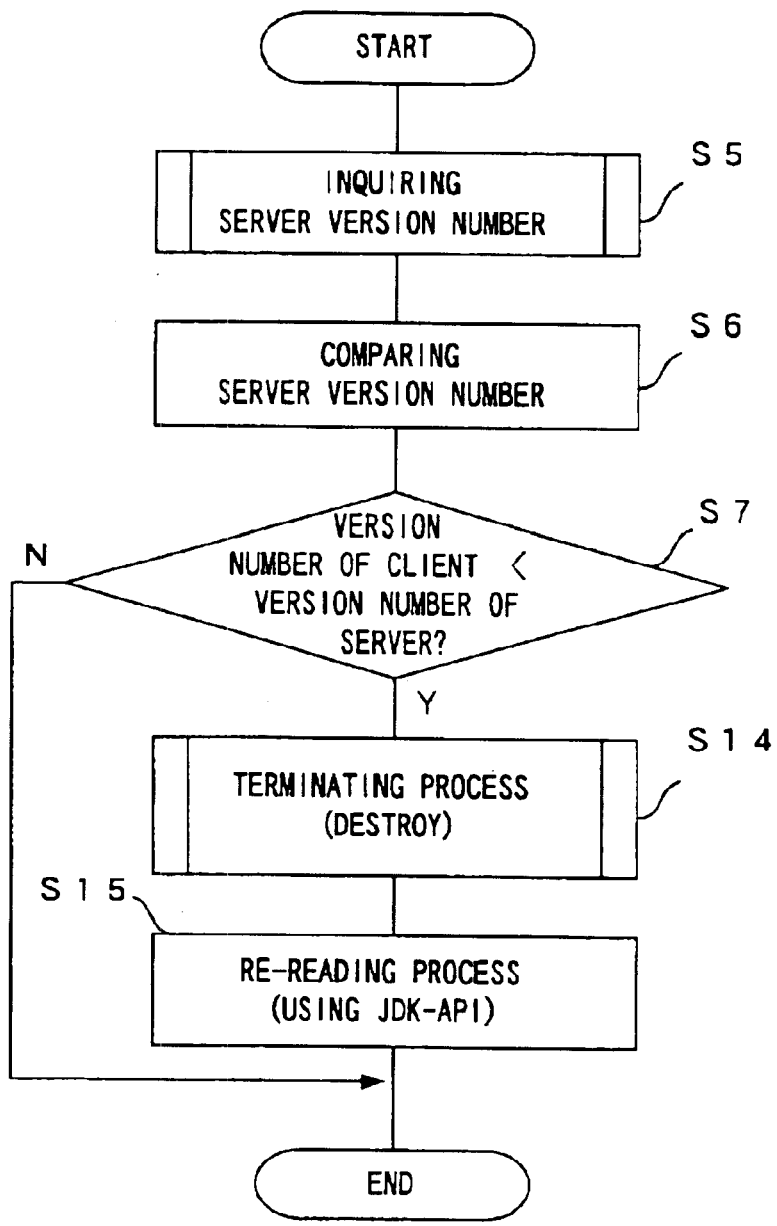
F I G. 7

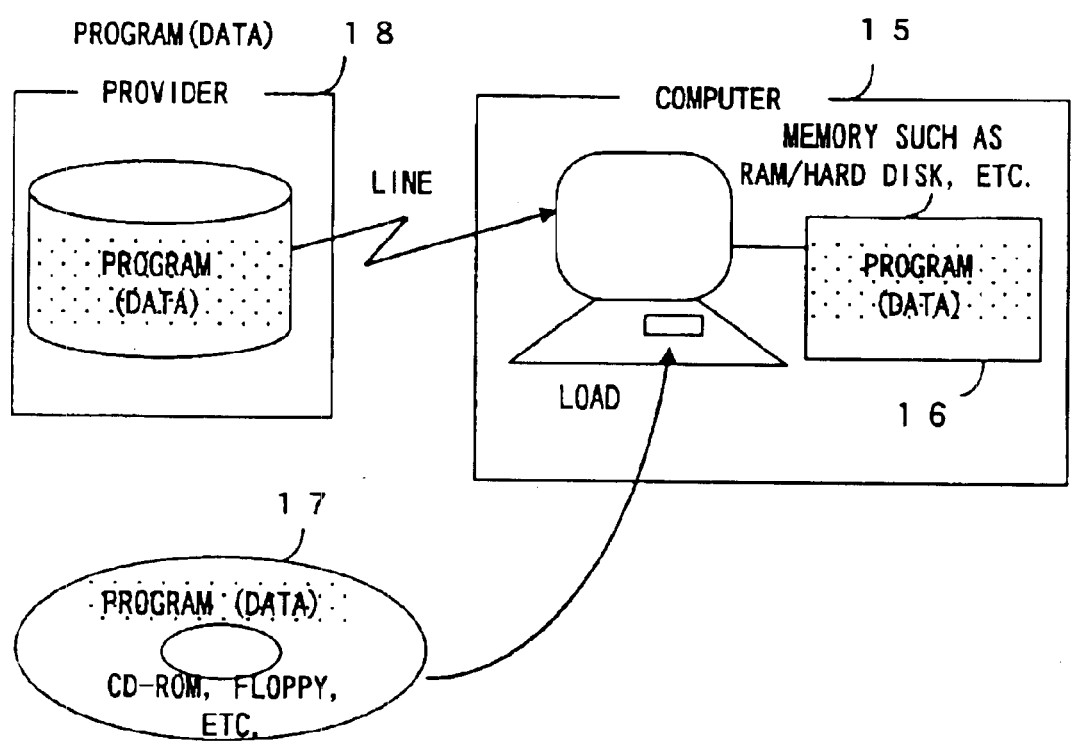
F I G. 1 1

SYSTEM AND METHOD FOR AUTOMATICALLY SETTING APPLET LATEST VERSION

BACKGROUND OF THE INVENTION

1. Field of the Invention

The present invention relates to an applet latest version automatically setting system and method for automatically setting the latest version of an applet such as a Java applet, etc. at a request of a client.

2. Description of the Prior Art

An applet program operated on different pieces of software is used in the current computer technology. Especially, a Java applet is expressed in a Java language, incorporated into an HTML file, and executed on a Web server.

Conventionally, the above mentioned Java applet is downloaded by a server when a client invokes a Web page, and is cached and used on the Java virtual machine of the Web browser. Normally, the Java applet is downloaded and used on the main memory of a client, but can be temporarily stored on a disk (hard disk, etc.) of a client, and then transmitted to the main memory for execution.

However, in the conventional system, after transmitting an applet to a client, the applet on the server side can be rewritten as the latest version. In this case, normally, the update of an applet is not notified to the client. Therefore, the client performs a process using an applet of an old version.

In such a case, the already cached and operated applet is updated by the browser using a button, and an applet can be read again. However, the server cannot predict when the version of an applet is updated, thereby performing an inefficient operation. In addition, depending on the setting of a browser, only an applet written to, for example, a disk can be read although a cached applet is re-read without updating the version of the applet.

SUMMARY OF THE INVENTION

The present invention has been developed to solve the above mentioned problems, and aims at providing a system and a method for automatically setting the latest version of an applet by storing a program for updating the version in the method for the applet, and realizing the update of the version of the applet in the process of the applet itself.

That is, the above mentioned purpose can be attained by the present invention by providing an applet latest version automatically setting system including: a server having an applet storage unit for storing an applet of the latest version, and a version number storage unit for storing the version number of an applet stored in the applet storage unit; and a client having a version number information storage unit for performing a process based on the applet read from the server, and storing the version number information about the applet, a comparison unit for reading the version number information about the applet of the latest version from the version number storage unit when a predetermined event occurs, and comparing the read information with the version number information stored in the version number information storage unit, and an update unit for reading the applet of the latest version from the applet storage unit and updating the applet when the comparison process outputs a non-matching result.

The applet stored in the applet storage unit is, for example, a program written in the Java language, and is sequentially updated, thereby storing the applet of the latest version. In addition, the version number information storage unit stores the version number information about the applet of the latest version.

For example, the server storing the above mentioned applet of the latest version can be a Web server, and communications are established between the server and the Web browser set for the client.

BRIEF DESCRIPTION OF THE DRAWINGS

FIG. 1 shows the configuration of the system of the applet latest version automatically setting system according to an embodiment of the present invention;

FIG. 4 is a flowchart of the processing operations according to an embodiment of the present invention;

FIG. 7 is a flowchart of the version number checking process;

FIG. 11 shows an example of a case in which a storage medium is used.

DESCRIPTION OF THE PREFERRED EMBODIMENT

Figure 2A:
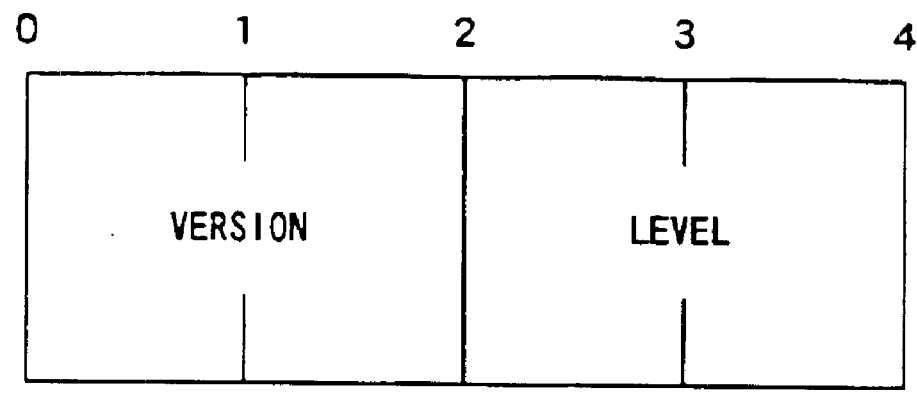
FIG. 2A shows the configuration of the memory area in which the version number information about the latest version is entered.

The embodiments of the present invention are described below by referring to the attached drawings.

FIG. 1 shows the configuration of the applet latest version automatically setting system according to the an embodiment of the present invention. In FIG. 1, the system includes a server 1 and a client 2 connected to the server 1. A plurality of clients 2 are practically connected to the server 1, but the connection to one client is shown in FIG. 1. A Web server 3 is set in the server 1. Memory 4 in which the applet program of the latest version is entered, and a version number file 5 in which the version number information about a corresponding latest applet is entered are set in the Web server 3. The applet entered in the memory 4 is a program for driving the Java, and the applet drives the Java virtual machine described later and performs a process.

Figure 2B:
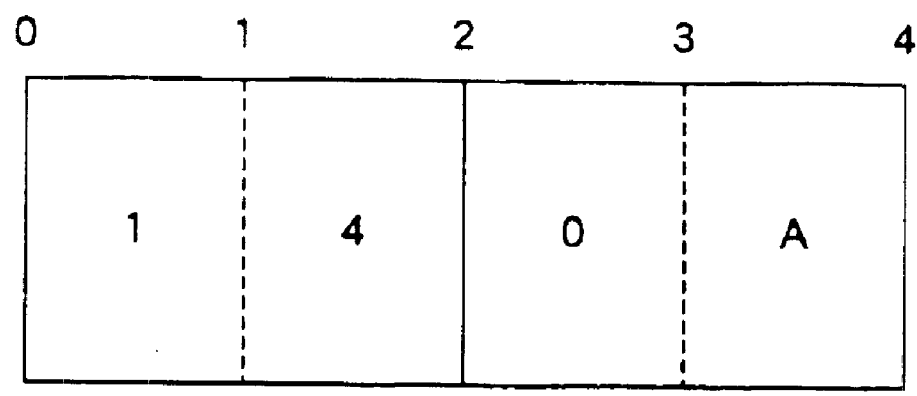
FIG. 2B shows an example of actual data written to a memory area.

The version number information about the latest version is stored in the version number file 5 in, for example, the format shown in FIG. 2. FIG. 2A shows the memory format of the version number file 5 configured by 4 bytes with the lower 2 bytes indicating version information and the higher 2 bytes indicating level information. For example, the version number 'V20L10' shown in FIG. 2B indicates the applet of the latest version having the version number is 20, and the level is 10. Therefore, in this case, as shown in FIG. 2B, the version area of the version number file 5 stores 14, and the level area stores 0A. The above mentioned level indicates, for example, a development number in the same version. According to the present invention, it is not always necessary to include a level in the latest version.

On the client 2 side, the software of a Web browser 6, a Java virtual machine (VM) 7, and an applet 8 are set. The applet 8 is entered in a cache area 9. The version number information about the applet being operated is stored in a process unit 10. For example, the version number information storage area is set at a predetermined address.

The Web browser 6 displays the image of the data in the HTML (hyper text markup language), format provided from the Web server 3, and the applet (Java applet) 8 performs a process using the Java virtual machine 7. The above mentioned applet reads the applet of the latest version from the server 1 in the method described later, and updates the applet written in the cache area 9. A display (DSP) 2' displays according to the operation of the above mentioned applet.

Figure 3:
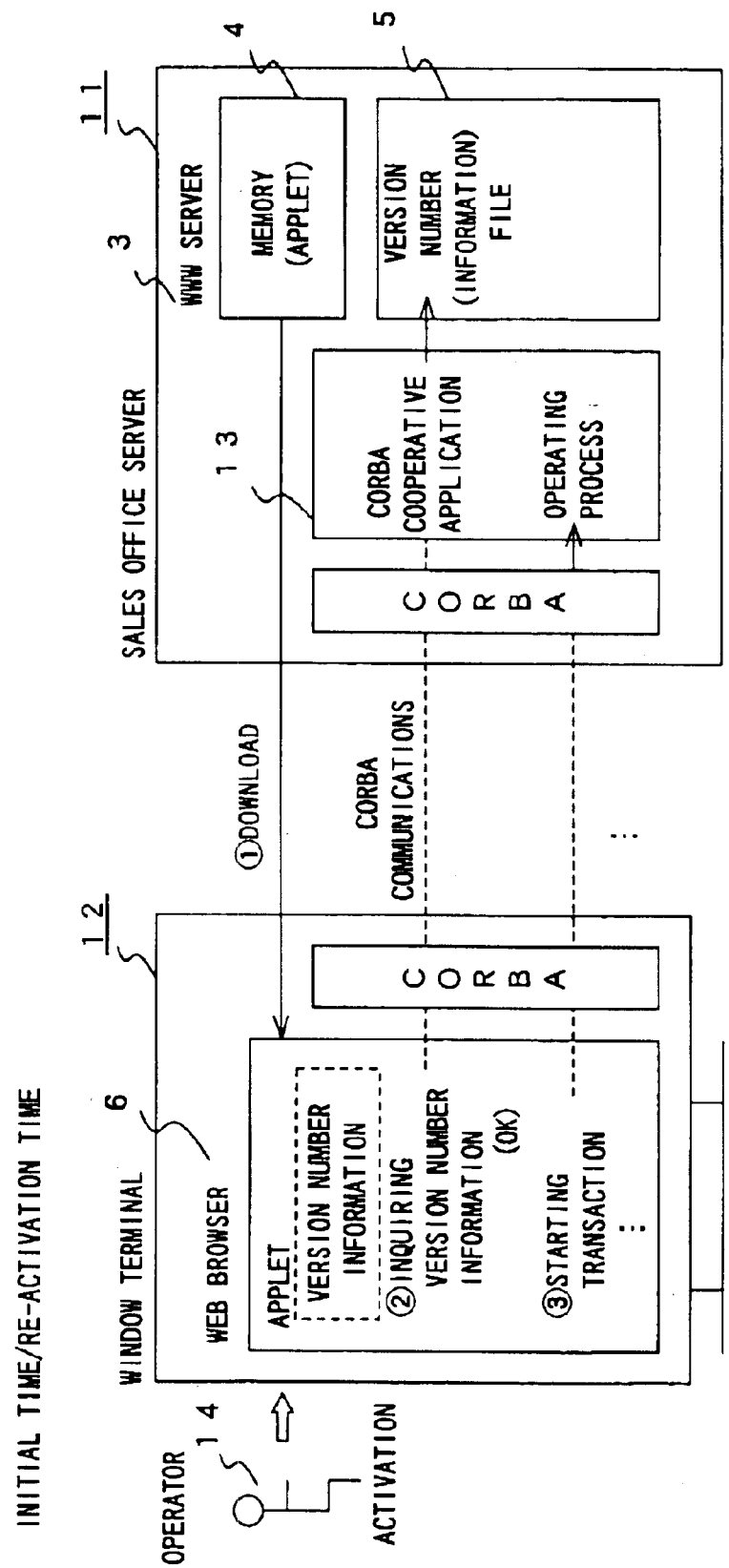
FIG. 3 shows the configuration of the system according to an embodiment of the present invention which is applied to a sales office server and a window terminal.

FIG. 3 shows an example in which the relationship between the above mentioned server 1 and the client 2 is applied to the sales office server and the window terminal of a bank. A sales office server 11 corresponds to the server 1, and a window terminal 12 corresponds to the client 2. The sales office server 11 has the Web server 3, the memory 4, and the version number file 5 as described above, and CORBA (common object request broker architecture) communications are established between the server and the window terminal 12. To attain this, a cooperative application 13 for establishing the CORBA communications is also installed.

In addition, the above mentioned Web browser 6 system can be activated by an operator 14. In addition, the applet used in this case relates to banking operations, and has the displays and functions required by the operator at the window of a bank.

In the applet latest version automatically setting system with the above mentioned configuration, the processing operations are performed as described below.

FIG. 4 is a flowchart of the processing operations according to the present invention, and shows the main process of an applet. In the following explanation, the Web server 3 of the sales office server 11 which is the server 1, and the Web browser 6 of the window terminal 12 which is the client 2 have already been activated.

Figure 5:
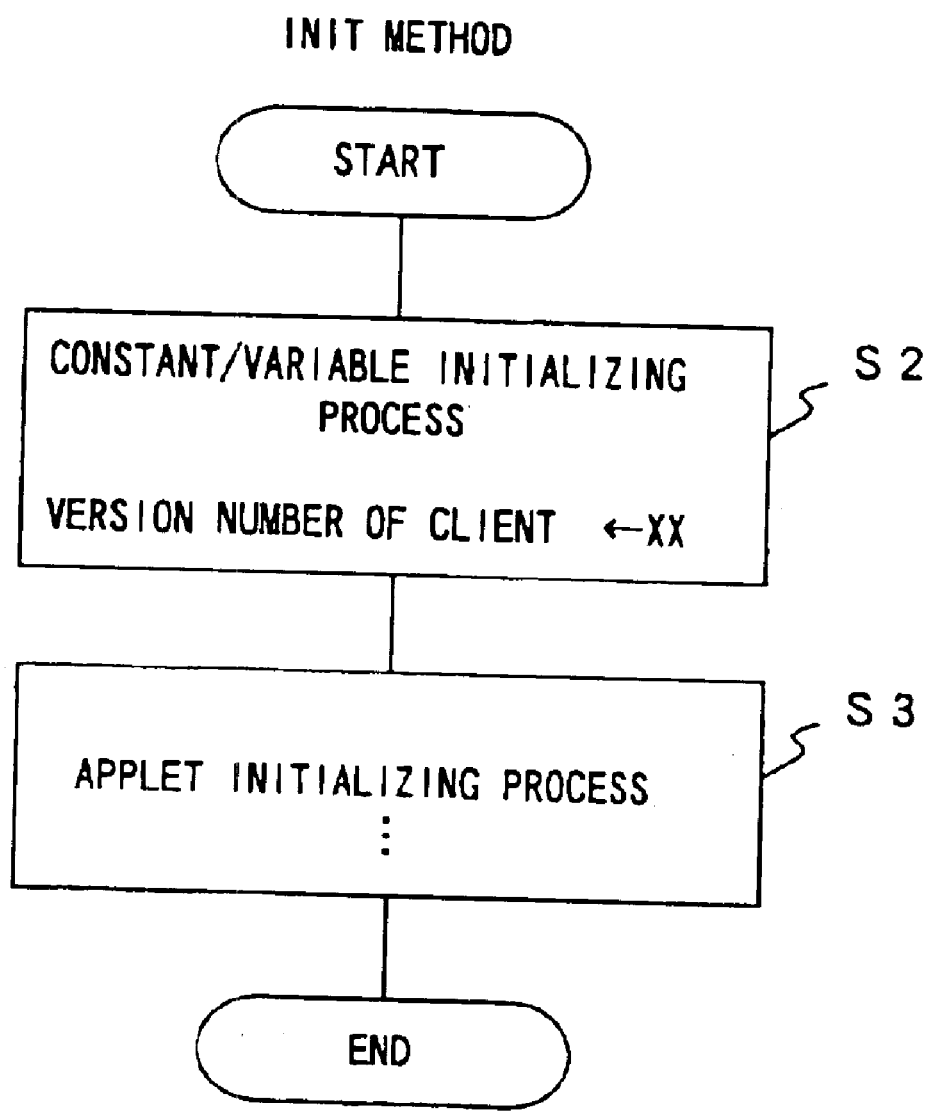
FIG. 5 is a flowchart of the processing operations in the initial method.
Figure 6:
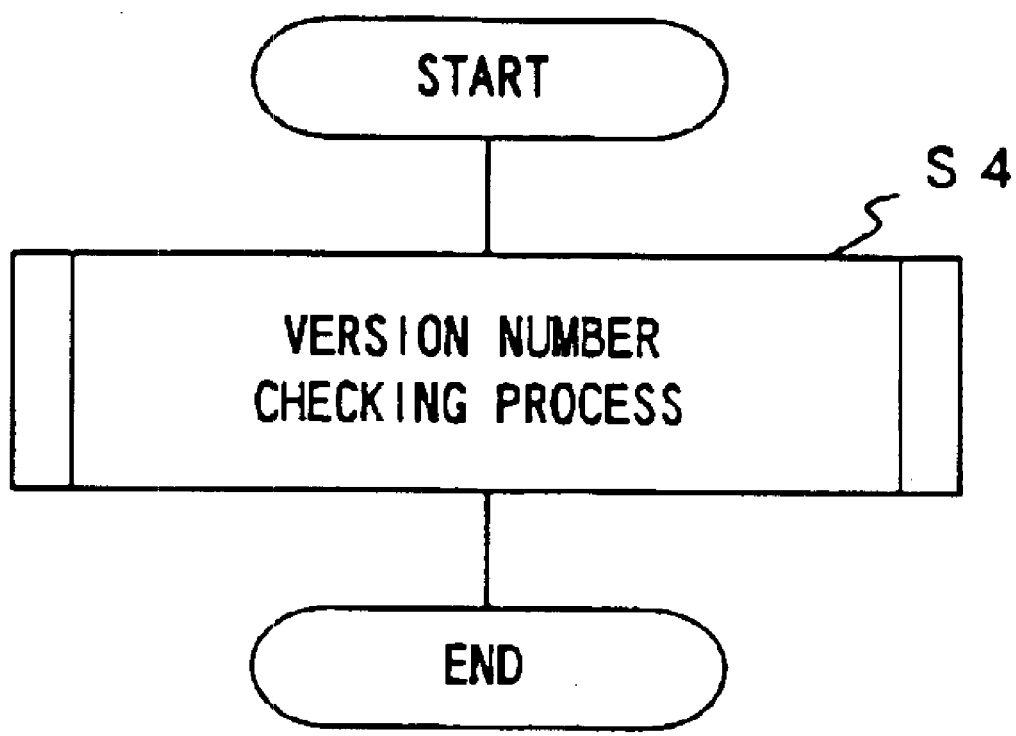
FIG. 6 is a flowchart of the processing operations in the starting method.

First, an initializing process is performed (step (hereinafter expressed by S) 1). This initializing process (init) activates the Web browser 6, reads the applet from the server 1, and loads the applet of the latest version to the cache area 9 in the client 2 (window terminal 12). Then, practically, the initial method shown in FIG. 5 is performed. That is, the constant/variable initializing process is performed (S2), and the version number of the applet loaded on the cache area 9 is set. In this case, for example, when the current version of the applet is 'V20L10' as shown in FIG. 2, the data of '140A' is written. Then the applet initializing process is performed (S3). Next, the version number checking process is performed (S4). The version number checking process is performed when an applet is started, and is performed in the process of the applet starting method. FIG. 6 shows the process, and the version number checking process is performed in the starting method (S4'). Therefore, this process is described by referring to the version number checking process (start).

FIG. 7 is a flowchart practically showing the version number checking process. First, the version number is inquired of the server 1 (sales office server 11) (S5). Then, it is compared with the version number information stored in the memory of the server 1 (S6). If the version number of the applet read to the client 2 is smaller than the version number of the server 1 (version number of client<version number of server), then the terminating process described later is performed (YES in S7).

Figure 8:
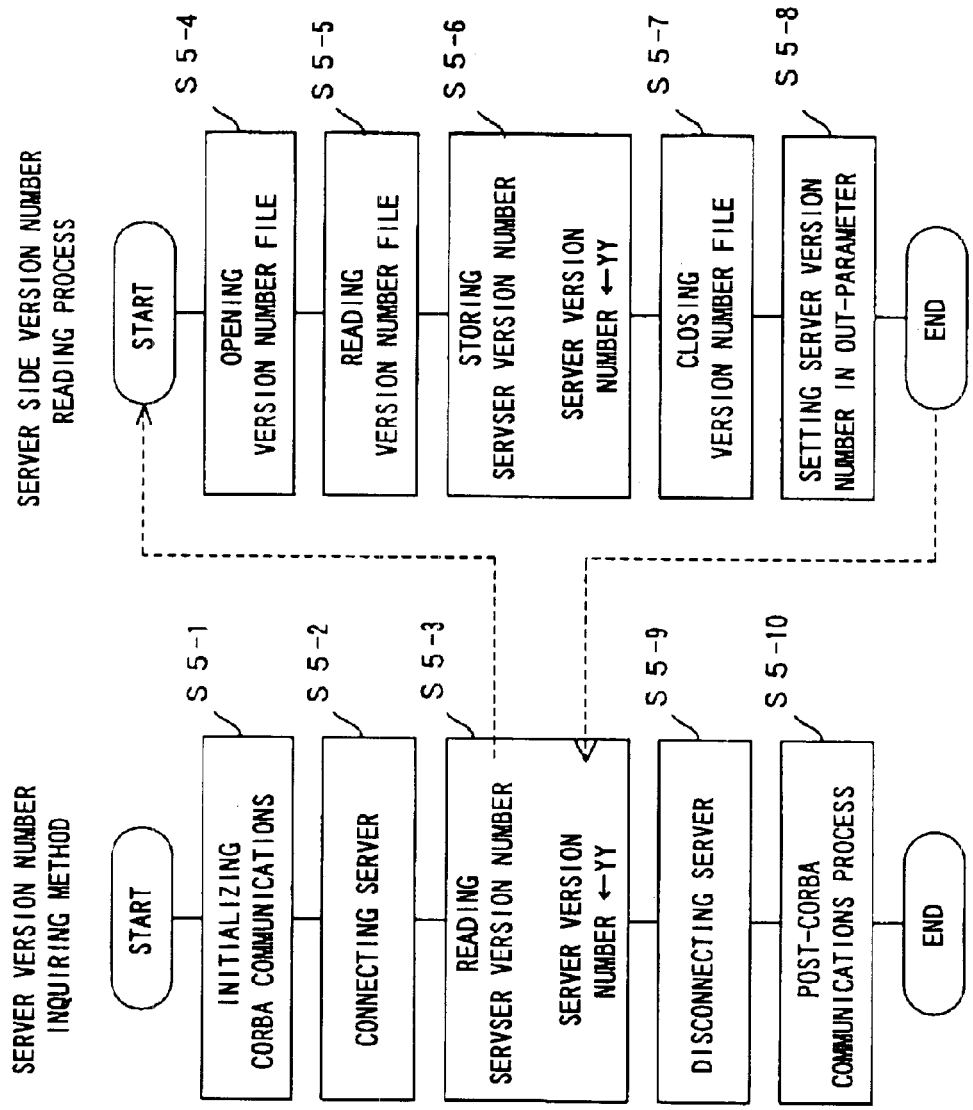
FIG. 8 is a flowchart of the version number inquiring method.

FIG. 8 is a flowchart of the server version number inquiring process and the server version number reading process. This process is performed according to the server version number inquiring method. This process is performed by initializing the CORBA communications on the client 2 (window terminal 12) side (S5-1), and the client is connected to the server 1 (sales office server 11 (S5-2). Then, the version number information about the applet is read from the version number file 5 in the sales office server 11 (S5-3).

In this case, the version number file 5 in the server 1 (sales office server 11) is opened (S5-4), and the version number file is read (S5-5). Then, the read version number information is written (S56), and the version number file is closed (S5-7) Then, the version number of the server is set in the out-parameter (S5-8), the server 1 (sales office server 11) is disconnected (S5-9), and the post-CORBA communications process is performed (S510).

Thus, the version number inquiring process is performed as described above. However, the version number checking process (start) is performed when the starting method process is performed after the applet initialization, and the version number of the applet read by the Web server 3 matches the version number of the server 1 (version number of client=version number of server). Therefore, the determination (S7) is N (NO). As a result, in the version number checking process in the starting method, an event waiting state is entered (S8).

Then, a normal transaction is started. For example, the client 2 (window terminal 12) requests the server 1 (sales office server 11) to perform a process online. Depending on the contents of the operation, the process is performed offline, and can be performed only by the window terminal 12.

During the process, the occurrence of an event is awaited (N in SB and S9). When an event occurs (Y (YES) in S9), it is determined whether or not it is a user event (S10). If it is a user event, it is furthermore determined whether or not an online process is required (S11). A user event refers to a process requiring the above mentioned online process, and the client is connected to the server 1 (sales office server 11) to use the application of the server 1.

In this case, the version number checking process (S12) is first performed. The version number checking process (S12) is performed according to the flowchart shown in FIG. 7. That is, the version number is inquired of the server 1 (S5), the version number data is compared (S6), and the version number about the applet is compared with the version number of the server 1 to know whether of not the version number of the client is smaller than the version number of the server 1 (version number of client<version number of server) (S7). The version number inquiring process is performed according to the above mentioned version number inquiring method (S5-1 through S5-10 shown in FIG. 8).

As a result of the above mentioned process, the version number information read to the version number file is compared with the version number of the currently read applet. If the version numbers match each other, the user-specified event process is performed (S13), control is returned to the event wait state (S9). In this case, the version number of the applet entered in the server 1 (sales office server 11) is not updated, the version number of the server is equal to the version number of the applet of the client 2

(window terminal 12), the applet used in the current client 2 is the latest applet, the applet is not updated, and the current applet performs a terminal operations.

Figure 9:
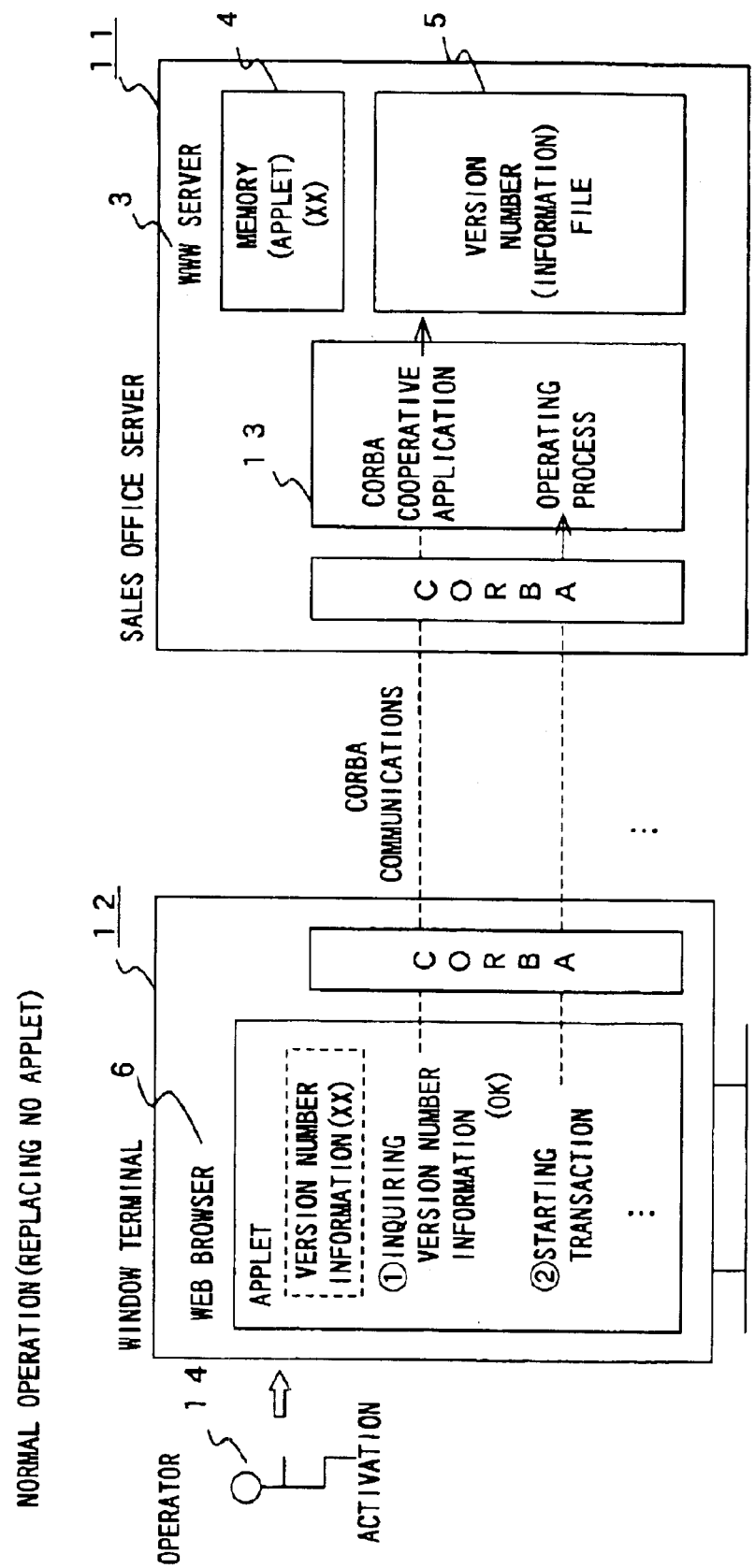
FIG. 9 shows the link mechanism on the right.

FIG. 9 shows a type of the above mentioned process. In this case, the version number memory of the server 1 (sales office server 11) stores the applet of the latest version, and the version number of the applet is not updated. Therefore, the version number information maintains as is. As a result, the above mentioned version number information inquiring process (1 shown in FIG. 9) is performed, it is determined whether or not the version numbers match each other, and the transaction starting process is performed (2 shown in FIG. 9).

On the other hand, if the version number of the client is smaller than the version number of the server (Y (YES) in S7) in the above mentioned determining process (S7), then it is determined that the version number of the applet is updated, and the terminating process is performed (S14).

This process is a destroying process (S14), the program of the applet stored in the cache area 9 is removed, and the applet of the latest version is read from the server 1 (S15).

The version number information about a corresponding version is read from the version number file 5, and written to the memory of the client 2. For example, updated data of '1500 or '140B' is written to the memory.

In the above mentioned process, when an event occurs, but not in an online process (N (NO) in S11), for example, when a process is performed with control passed to another Web page not using an applet, a corresponding user event process is performed (S16).

On the other hand, if the Web server 3 displays another Web page, or if the browser is displayed as an icon, an applet is in an inactive state. If control is returned to the Web pace or a browser displayed as an icon is restored, then a system event occurs (N (NO) in S10). In this case, it is determined whether or not the above mentioned starting event is being performed (S17).

If the starting method is activated (YES in S17), then the above mentioned version number checking process (start) is performed. This process is also performed according to the flowchart shown in FIG. 7, the version number inquiring process (S5, S5-1 through S5-10) and the comparing process are performed (S6 and S7). If the version number of the client is smaller than the version number of the server, then it is determined that the version number of the applet has been updated, and the terminating process is performed (Y (YES) in S7, S14). Therefore, in this case, the applet stored in the cache area 9 is deleted, the applet of the latest version is read from the server 1 and stored (S15). In addition, the version number information about the corresponding version is read from the version number file 5, and written to the memory of the client 2.

Figure 10:
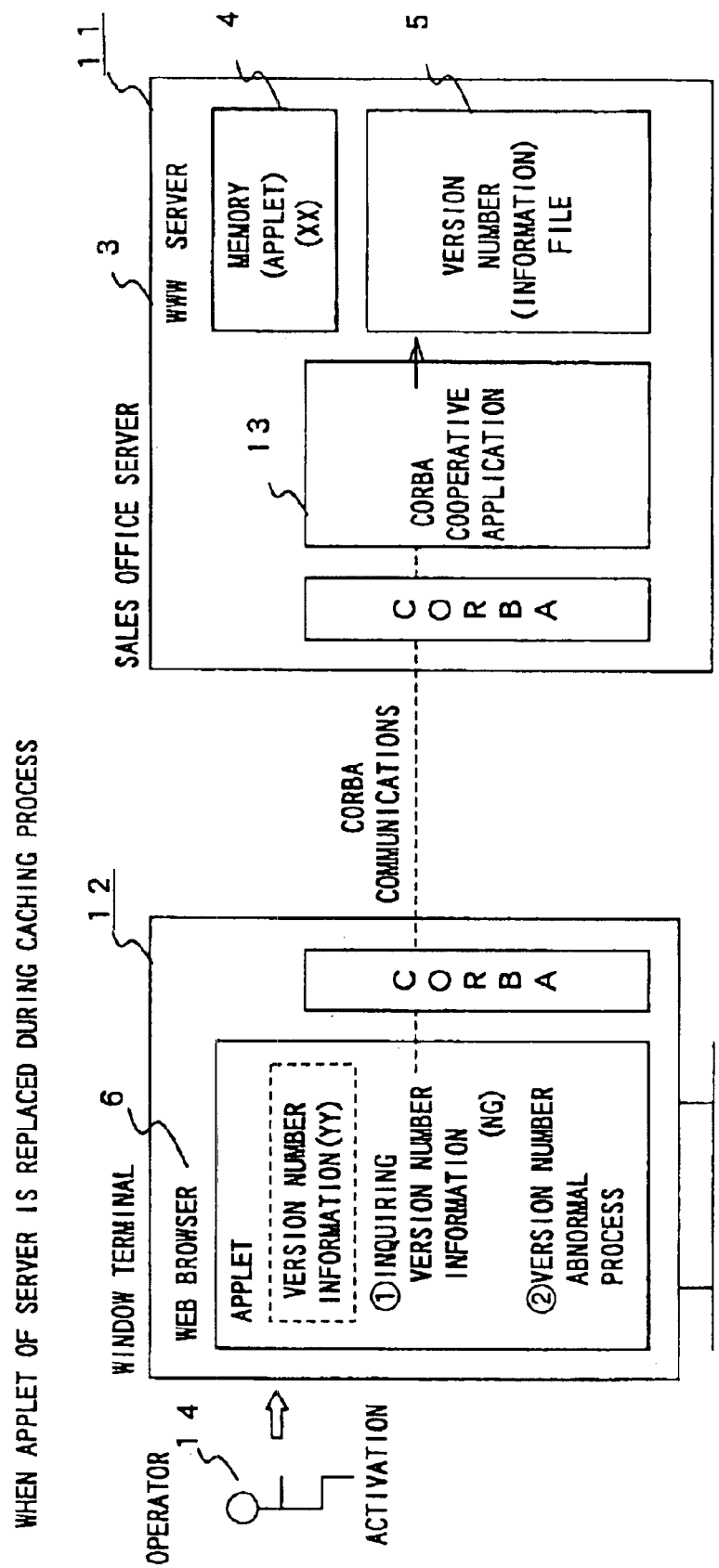
FIG. 10 is an oblique view of the link mechanism.

FIG. 10 shows a type of the above mentioned process. The applet of the server 1 (sales office server 11) is updated, and the version number information is different. Therefore, the version number information inquiring process (1 shown in FIG. 10) is performed, and the version number information is rewritten (2 shown in FIG. 10).

By performing the above mentioned process, the memory of the client 2 (window terminal 12) stores an applet of the latest version, and based on the applet of the latest version, an image and animation can be displayed.

When the above mentioned system event which is not a starting event occurs, it is determined whether or not it is a destroy event (S19). If it is a destroy event, the terminating process is performed (S20). The terminating process deletes the program of the applet stored in the main memory as described above, reads the applet of the latest version from the server 1, and stores it.

If it is not determined to be a destroy event (S19), a specified event process is performed (S21) If an applet is set in an active state as described above according to the present invention, or if the version number of an applet is checked under a predetermined condition, for example, when a user event requiring the online process, and the applet is not the latest version, then the applet is necessarily updated into the latest version. Therefore, the Web browser 6 can be operated by the applet of the latest version.

According to the present embodiment, the version number checking process is performed in the above mentioned starting method, etc., but is not limited to the described method.

The version number information according to the present embodiment contains the version information and the level information as shown in FIG. 2, but can be formed by the version information only.

According to the present embodiment, the server 1 of the system is the sales office server 11 of a bank, and the client 2 is the window terminal 12 of a bank. However, the present invention is not limited to the above mentioned bank system, but can be applied to other fields such as insurance and policy systems.

Furthermore, the applet latest version automatically setting system according to the present invention can also be realized using the system shown in FIG. 11. That is, as shown in FIG. 11, a CPU (computer) 15 performs a process on the above mentioned system using a program (data) provided by a hard disk 16.

As shown in FIG. 11, not only the program (data) provided by the internal RAM and hard disk 16, but also data is transmitted to and received from an externally connected storage medium. For example, a process can be performed according to the program provided from a storage medium 17 such as a magnetic disk, a magnetic tape, a floppy disk, an optical disk, etc.

Furthermore, as shown in FIG. 11, a program (data) can be received from a provider 18 through a communications line.

As described above in detail according to the present invention, the Web browser can be operated always using an applet of the latest version.

In addition, the transaction reliability can be greatly improved when a client and a server cooperates with each other in a bank online system, etc. and an important transactions requiring high reliability is realized using a portable program such as a java applet, etc.

What is claimed is:

1. An applet latest version automatically setting system, comprising:

a central office server of a banking institution having an applet storage unit storing an applet of a latest version and having a single-program structure, and a version number storage unit storing a version number of the applet stored in the applet storage unit; and a branch office terminal unit of the banking institution having a version number information storage unit performing a process based on the applet read from said server, and storing a local version number of the applet, a comparison unit reading the version number of the applet of the latest version from the version number storage unit of the central office server when a predetermined event occurs, and comparing the read version number with the local version number stored in the version number information storage unit, and an update unit reading the applet of the latest version from the applet storage unit of the central office server and updating an applet at the branch office terminal unit when the comparison unit outputs a non-matching result, wherein the predetermined event includes at least one of an initialization of the applet or a detection of a user event causing performance of an online process during execution after the applet is initialized, and wherein the applet at the branch office terminal unit is deleted and the applet of the latest version is retrieved when the applet at the branch office terminal unit is terminated.

2. The system according to claim 1, wherein said applet is a processor-independent byte-code applet.

3. The system according to claim 2, wherein said predetermined event occurs when the applet becomes active.

4. The system according to claim 1, wherein distributed object computing infrastructure communications are established between said central office server and said branch office terminal unit.

5. The system according to claim 1, wherein said version number storage unit is a main memory or a disk unit.

6. A central office server of a banking institution, comprising:

an applet storage unit updating and persistently storing an applet of a latest version, the applet having a single-program structure; and a version number storage unit storing a version number of the applet stored in said applet storage unit, wherein the version number is read from said version number storage unit at a version number information read request, and is transmitted to a branch office terminal unit, wherein the version number information read request is caused by at least one of an initialization of the applet or a detection of a user event causing performance of an online process during execution after the applet is initialized, and wherein the applet at the branch office terminal unit is deleted and the applet of the latest version is retrieved when the applet at the branch office terminal unit is terminated.

7. The server according to claim 6, wherein said applet is a processor-independent byte-code applet.

8. A branch office terminal unit of a banking institution, comprising:

a version number information storage unit performing a process based on an applet having a single-program structure read from a central office server of a banking institution, and storing a local version number about the applet;

a comparison unit reading the version number of the applet of the latest version from the central office server when a predetermined event occurs, and comparing the read version number with the version number stored in said version number information storage unit; and an update unit reading the applet of the latest version from said applet storage unit and updating the applet at the branch office terminal unit when the comparison unit outputs a non-matching result, wherein the predetermined event includes at least one of an initialization of the applet or a detection of a user event causing performance of an online process during execution after the applet is initialized, and wherein the applet at the branch office terminal unit is deleted and the applet of the latest version is retrieved when the applet at the branch office terminal unit is terminated.

9. The terminal unit according to claim 8, wherein said applet is a processor-independent byte-code applet.

10. The terminal unit according to claim 9, wherein said predetermined event occurs when the applet becomes active.

11. The terminal unit according to claim 9, wherein said version number information storage unit is a main memory or a disk unit.

12. The terminal unit according to claim 8, wherein said version number information storage unit is a main memory or a disk unit.

13. An applet latest version automatically setting method, comprising:

storing an applet of a latest version and having a single-program structure in an applet storage unit of a central office server;

storing a version number of the applet in a version number storage unit of the central office server;

storing the version number read from said version number storage unit in a version number information storage unit of a branch office terminal unit of the banking institution as a local version number;

reading the version number of the applet of the latest version from the version number storage unit of the central office server when a predetermined event occurs, and comparing the read version number with the local version number stored in the version number information storage unit; and reading the applet of the latest version from the applet storage unit of the central office server when the comparison produces a non-matching result, and updating the applet on the terminal unit, wherein the predetermined event includes at least one of an initialization of the applet or a detection of a user event causing performance of an online process during execution after the applet is initialized, and wherein the applet at the branch office terminal unit is deleted and the applet of the latest version is retrieved when the applet at the branch office terminal unit is terminated.

14. The method according to claim 13, wherein said applet is a processor-independent byte-code applet.

15. A computer-readable storage medium storing a program used to direct a computer to perform:

storing an applet of a latest version and having a single-program structure in an applet storage unit of a central office server of a banking institution;

storing a version number of the applet in a version number storage unit of the central office server;

storing the version number read from said version number storage unit in a version number information storage unit of a branch office terminal unit of the banking institution as a local version number;

reading the version number of the applet of the latest version from the version number storage unit of the central office server when a predetermined event occurs, and comparing the read version number with the local version number stored in the version number information storage unit; and reading the applet of the latest version from the applet storage unit of the central office server when the comparison produces a non-matching result, and updating the applet on the terminal unit, wherein the predetermined event includes an initialization of the applet and a detection of a user event causing performance of an online process during execution after the applet is initialized, and wherein the applet at the branch office terminal unit is deleted and the applet of the latest version is retrieved when the applet at the branch office terminal unit is terminated.

16. An applet latest version automatically setting system, comprising:

an applet having a single-program structure and which performs version management independently of other applets;

a central office server of a banking institution storing a latest version of the applet and a version number of the applet;

a branch office terminal unit of the banking institution storing a local version number of the applet and having a comparison unit which reads the version number of the applet on the central office server when a specified event occurs and which compares the read version number with the local version number, the branch office terminal further having an update unit which reads the latest version of the applet from the central office server and updates the applet at the terminal unit when the comparison unit outputs a non-matching result, the terminal unit not storing in advance information of versions of a plurality of applets, wherein the specified event includes at least one of an initialization of the applet or a detection of a user event causing performance of an online process during execution after the applet is initialized, and wherein the applet at the branch office terminal unit is deleted and the applet of the latest version is retrieved when the applet at the branch office terminal unit is terminated.

* * * * *